US009477651B2

(12) United States Patent
Agarwal et al.

(10) Patent No.: US 9,477,651 B2
(45) Date of Patent: Oct. 25, 2016

(54) FINDING PARTITION BOUNDARIES FOR PARALLEL PROCESSING OF MARKUP LANGUAGE DOCUMENTS

(75) Inventors: Manoj K. Agarwal, Noida (IN); Amir Bar-Or, Newton (NZ); Manish Anand Bhide, New Delhi (IN); Sebastian Ertel, Cambridge (GB); Sriram K. Padmanabhan, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 433 days.

(21) Appl. No.: 12/893,248

(22) Filed: Sep. 29, 2010

(65) Prior Publication Data

US 2012/0079364 A1 Mar. 29, 2012

(51) Int. Cl.
G06F 17/27 (2006.01)
G06F 9/45 (2006.01)
G06F 17/22 (2006.01)

(52) U.S. Cl.
CPC .......... *G06F 17/2705* (2013.01); *G06F 8/456* (2013.01); *G06F 17/2229* (2013.01); *G06F 17/2247* (2013.01)

(58) Field of Classification Search
CPC .......... G06F 17/2247; G06F 17/2229; G06F 17/272; G06F 17/2264
USPC ....................................................... 715/234
See application file for complete search history.

(56) References Cited

U.S. PATENT DOCUMENTS

| 6,222,634 B1* | 4/2001 | Dubbels ............ G06F 17/30899 358/1.15 |
| 6,801,938 B1 | 10/2004 | Bookman et al. |
| 7,209,925 B2 | 4/2007 | Srinivasan et al. |
| 7,210,097 B1* | 4/2007 | Clarke .............. G06F 17/30917 707/999.202 |
| 7,257,818 B2 | 8/2007 | Foerg et al. |
| 8,452,444 B1* | 5/2013 | Low ........................ G06Q 10/00 700/215 |
| 8,825,593 B2* | 9/2014 | Dodds ............... G06F 17/30592 705/7.26 |
| 8,886,591 B2* | 11/2014 | McDonald ........................ 705/4 |
| 9,031,901 B1* | 5/2015 | King ................... G06F 12/0802 707/602 |
| 9,064,047 B2* | 6/2015 | Agarwal ............. G06F 11/3604 |
| 9,195,729 B2* | 11/2015 | Garg ................. G06F 17/30917 |
| 2002/0065822 A1* | 5/2002 | Itani ................... G06F 17/30914 |
| 2002/0143529 A1* | 10/2002 | Schmid ................. G10L 15/193 704/231 |
| 2004/0172387 A1* | 9/2004 | Dexter .............. G06F 17/30938 |
| 2005/0049996 A1* | 3/2005 | Srinivasan ........ G06F 17/30917 |

(Continued)

OTHER PUBLICATIONS

Wei Lu et al.; Parallel Approach to XML Parsing; GRID '06 Proceedings of the 7th IEEE/ACM International Conference on Grid Computing; 2006; pp. 223-230.*

(Continued)

*Primary Examiner* — Amelia Tapp
*Assistant Examiner* — Benjamin J Smith
(74) *Attorney, Agent, or Firm* — Susan Murray;SVL IPLaw (57) ABSTRACT

A method, a computer program product and a system identify partition locations within an extended markup language (XML) document without parsing so as to process portions of said document in parallel. The XML document includes sections required to remain continuous. The document is scanned for continuous sections without parsing, and boundaries of the initial partitions are adjusted to reside outside the continuous sections to determine resulting partitions for the document. The resulting partitions may be processed in parallel to provide the document information for storage.

14 Claims, 5 Drawing Sheets

(56) References Cited

U.S. PATENT DOCUMENTS

| | | | |
|---|---|---|---|
| 2005/0050459 A1 | 3/2005 | Qu et al. | |
| 2005/0144257 A1* | 6/2005 | Bayardo | G06F 17/2205 709/218 |
| 2007/0143666 A1 | 6/2007 | Harrington | |
| 2007/0150809 A1* | 6/2007 | Yoshida | G06F 17/2229 715/235 |
| 2007/0203934 A1* | 8/2007 | Anderson | G06F 17/248 |
| 2007/0214170 A1 | 9/2007 | Lin | |
| 2007/0237428 A1* | 10/2007 | Goodwin | G06K 9/00442 382/309 |
| 2008/0091714 A1* | 4/2008 | Idicula | G06F 17/30923 |
| 2008/0243483 A1* | 10/2008 | Schmid | G10L 15/193 704/9 |
| 2008/0267535 A1* | 10/2008 | Goodwin | G06K 9/00442 382/305 |
| 2009/0006944 A1* | 1/2009 | Dang | G06F 17/272 715/234 |
| 2009/0030921 A1* | 1/2009 | Kadiyska | G06F 17/272 |
| 2009/0089658 A1* | 4/2009 | Chiu | G06F 17/2705 715/234 |
| 2009/0319992 A1* | 12/2009 | Duffy | G06F 8/00 717/121 |
| 2010/0125783 A1 | 5/2010 | Beutnagel et al. | |
| 2011/0072319 A1* | 3/2011 | Agarwal | G06F 11/3604 714/49 |
| 2011/0153604 A1* | 6/2011 | Yu | G06F 17/2247 707/737 |
| 2014/0149852 A1* | 5/2014 | Sahoo | G06F 17/2247 715/239 |
| 2014/0237350 A1* | 8/2014 | Ryall | H04L 65/403 715/234 |

OTHER PUBLICATIONS

Hiroto Kurita et al.; Efficient Query Processing for Large XML Data in Distributed Environments; 21st International Conference on Advanced Networking and Applications(AINA'07); 2007; pp. 317-322.*

LMX A reverse-XML parser; http://boredzo.org/lmx; Mar. 3, 2007; http://web.archive.org/web/20070708213959/http://boredzo.org/lmx/; 2 pages.*

Imam Machdi et al.; Executing parallel TwigStack algorithm on a multi-core system; iiWAS '09 Proceedings of the 11th International Conference on Information Integration and Web-based Applications & Services; 2009; pp. 176-184.*

International Search Report and Written Opinion, PCT/EP2011/065482, Jan. 26, 2012, 10 pages.

Li et al., "Key Elements Tracing Method for Parallel XML Parsing in Multi-Core System", 2009 International Conference on Parallel and Distributed Computing, Applications and Technologies, Beijing, China (6 pages).

Head et al., "Parallel Processing of Large-Scale XML-Based Application Documents on Multi-core Architectures with PiXiMaL", IEEE Fourth International Conference on eScience, 2008, SUNY Binghamton, NY, (pp. 261-268).

Yu et al., "Data Placement and Query Processing Based on RPE Parallelisms", Proceedings of the 27th Annual International Computer Software and Applications Conference, 2003, Shenyang, China, (6 pages).

Bhide, et al., "XPEDIA: XML Processing for Data Integration", VLDB '09, Aug. 24-28, 2009, Lyon, Franch (12 pages).

Li et al., "Key Elements Tracing Method for Parallel XML Parsing in Multi-Core System", 2009 International Conference on Parallel and Distributed Computing, Applications and T.

Pan et al., "Simultaneous transducers for data-parallel XML parsing", 2008 IEEE International Parallel & Distributed Processing Symposium, pp. 1-12.

Nan et al., "Design and implementation of a parallel data partitioning algorithm for XML data", Mini-Micro Systems, vol. 25, No. 7, p. 1164-1169, Jul. 2004.

Head et al., "Parallel Processing of Large-Scale XML-Based Application Documents on Multi-core Architectures with PiXiMaL", IEEE Fourth International Conference on eScience, 2.

Yu et al., "Data Placement and Query Processing Based on RPE Parallelisms", 27th Annual International Computer Software and Applications Conference, 2003. COMPSAC 2003. Procee.

* cited by examiner

```xml
<?xml version="1.0" encoding="UTF-8"?>
```

202 {
```xml
<!-- Header context start here -->
<Company>
  <CompanyInformation id="companyA">
    <Address> ...</Address>
    <!-- Complete structure here -->
  </CompanyInformation>
  <Customers>
    <!-- Header context end here -->
```

204 {
```xml
    <!-- Body records will be <Customer> and starts here -->
    <Customer id="cust1">
        <!-- Complete structure here -->
    </Customer>
    <Customer id="cust1">
       <!-- Complete structure here -->
    </Customer>
    <Customer id="cust1">
       <!-- Complete structure here -->
    </Customer>
    <Customer id="cust1">
       <!-- Complete structure here -->
    </Customer>
    <!-- Large number of body records continue... -->
```

206 {
```xml
    <!-- Footer context starts here -->
  </Customers>

<DailyActivity date="10/5/2009"/>
</Company>

<!-- Footer context end here -->
```

FINDING PARTITION BOUNDARIES FOR PARALLEL PROCESSING OF MARKUP LANGUAGE DOCUMENTS

BACKGROUND

1. Technical Field

The present invention relates to finding partition boundaries in markup language documents, and more specifically, to finding partition boundaries in markup language documents to achieve efficient parallel processing of the markup language documents for extract, transfer, load (ETL) processes.

2. Discussion of the Related Art

Typically, large extended markup language (XML) documents, which can be on the order of a few or several gigabytes (GB) in size, are used to store information for further processing. The process for extracting data from an XML document for storing in a database (e.g., a data warehouse) is referred to as an extract, transform, load (ETL) process or ETL job. In particular, an ETL process involves extraction of data from one or more sources, transforming the data to fit the operational needs of the database, and loading the data into the database.

The processing of such large XML documents can be very time consuming when carried out by a single processor. Parallel processing of a large XML document (i.e., simultaneous processing or processing in parallel of portions of an XML document by one or more processors) can be utilized to more efficiently process the document.

Two known examples for parallel processing large XML documents are: (1) direct splitting of an XML document into multiple parts at fixed locations; and (2) parsing an XML document (either using a full parse or a shallow parse) to determine appropriate partition points within the document, and then partitioning the XML document at such points for parallel processing of such partitioned portions.

The first technique becomes nonfunctional in scenarios in which an XML document has character data (CDATA), a comment section, a nested node definition and/or some other section that must remain continuous and not split or partitioned. In particular, direct splitting of such an XML document at arbitrarily fixed locations (i.e., locations that have not been predetermined as appropriate partition points) can result in splitting of a section that must remain continuous, which would result in an incorrect or inaccurate processing of data or a failure to read the markup language in an ETL process.

The second technique requires parsing of the XML document in order to obtain precise and accurate partitions, and this can be very time consuming depending upon the size of the document which limits the benefits of parallel processing.

BRIEF SUMMARY

Accordingly, embodiments of the present invention include a method, a computer program product and a system for identifying partition locations within an extended markup language (XML) document without parsing to process portions of the document in parallel. The XML document includes sections required to remain continuous. The document is scanned for continuous sections without parsing, and boundaries of the initial partitions are adjusted to reside outside the continuous sections to determine resulting partitions for the document.

The above and still further features and advantages of embodiments of the present invention will become apparent upon consideration of the following detailed description thereof, particularly when taken in conjunction with the accompanying drawings wherein like reference numerals in the various figures are utilized to designate like components.

DETAILED DESCRIPTION

In accordance with embodiments of the present invention, a method, system and computer program product provides efficient parallel processing of XML documents (including "large XML documents, for example, XML documents having a size of at least about 1 GB) in an ETL process. The XML documents are partitioned in such a manner that ensures no splitting occurs between sections that must remain continuous. This is accomplished without the requirement of parsing the XML document to identify suitable partitions. The method of parallel processing described in accordance with embodiments of the present invention is particularly useful for ETL processing of an XML document having a large body of repeating sections or nodes disposed between a header and a footer of the document.

A method of finding locations for partitioning boundaries within an XML document and parallel processing of such partitioned boundaries includes a pre-processing phase in which the XML schema and ETL information are analyzed to determine partition nodes that are to be partitioned in the document to populate a database. Next, partition boundaries, including header context, footer context and the start and end points of each partition, are identified. Upon identification of appropriate partition boundaries, parallel processing of the partitioned sections at the boundaries is performed.

Figure 1A:
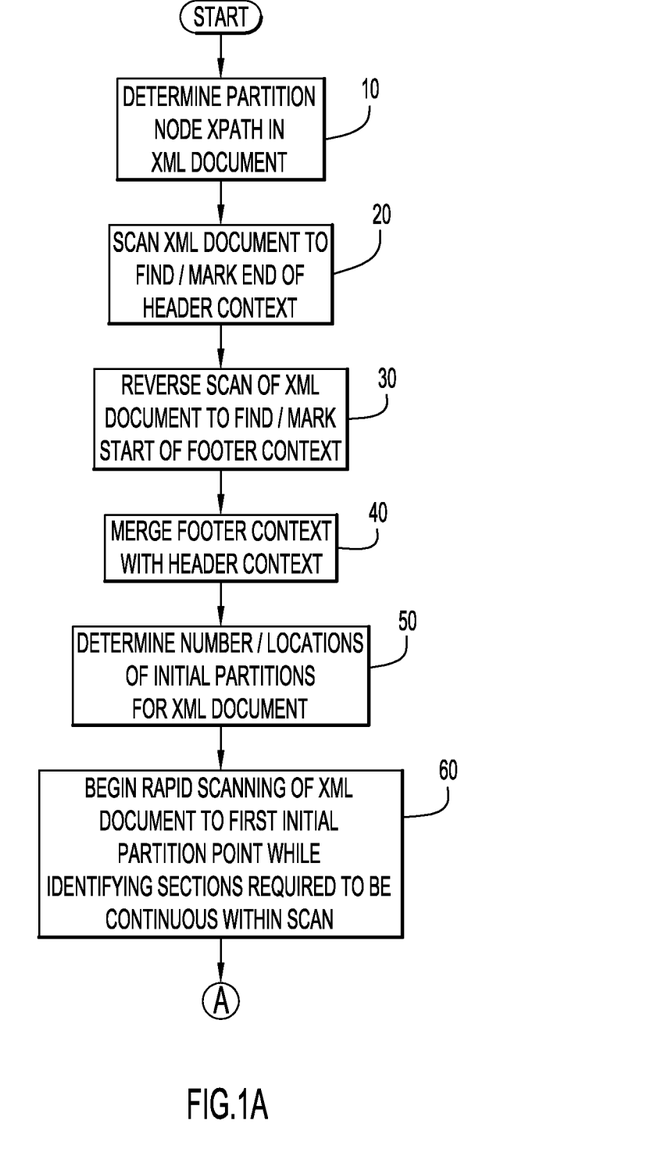
FIGS. 1A and 1B provide a flowchart depicting an example method of finding partitioning boundaries and parallel processing of partitioned boundaries to provide data in an ETL process according to an embodiment of the present invention.
Figure 1B:
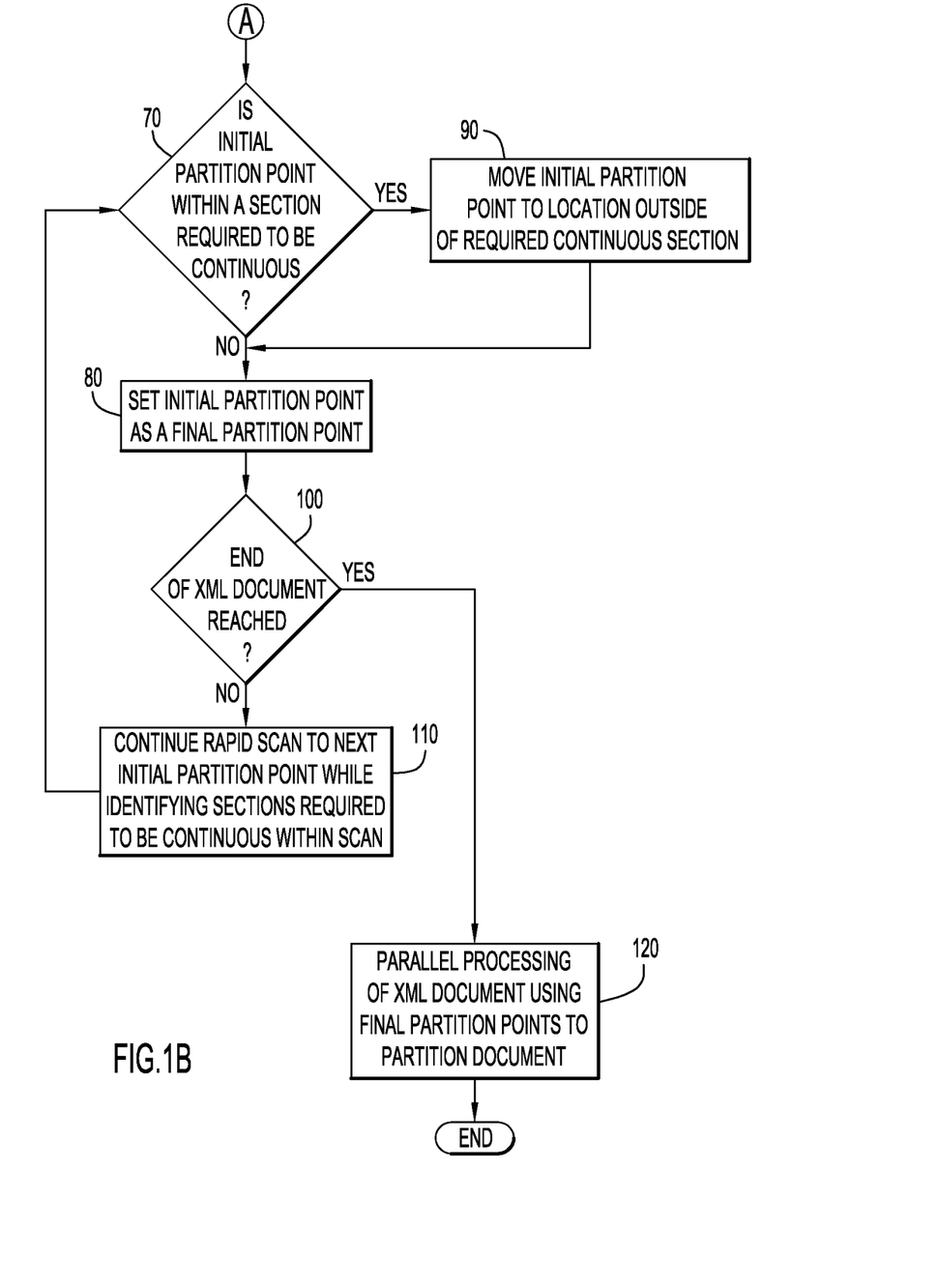
Figure 2:
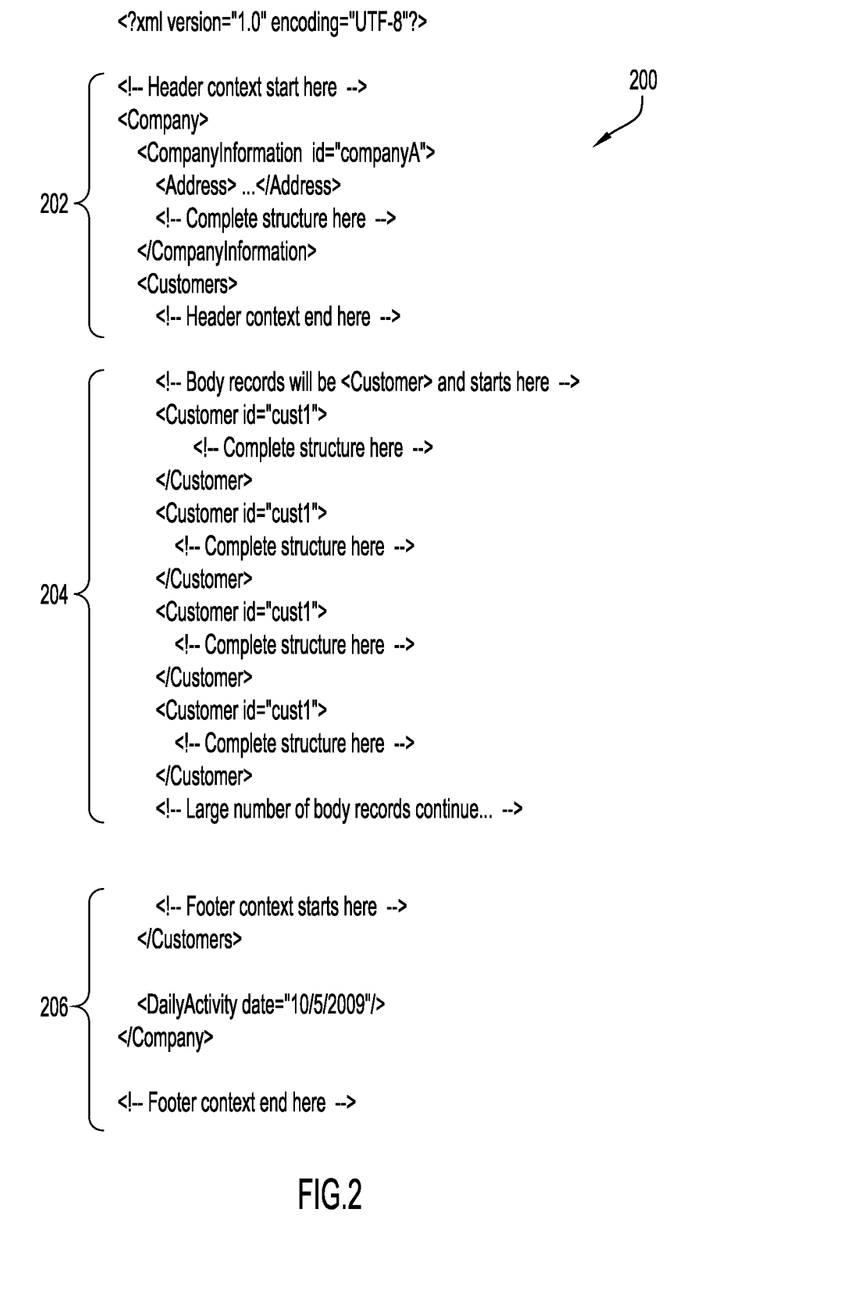
FIG. 2 illustrates an example XML document that is processed to populate a database with data from the XML document in accordance with an embodiment of the present invention.

An example method of finding partition boundaries and parallel processing of the partitioned boundaries to provide data in an ETL job according to an embodiment of the present invention is depicted in the flowchart of FIGS. 1A and 1B. In addition, an example XML document that can be processed utilizing the example method is depicted in FIG. 2. The example XML document can be about 1 GB or larger in size and includes company information with the body of the XML document including multiple repeated nodes of customer information, although XML documents processed accordingly may be larger or smaller.

In particular, the XML document 200 includes a header context 202, a footer context 206, and a large body portion 204 made up of repeating Customer nodes at the sub-trees rooted at the Company/Customers/Customer node level. The header context 202 includes all data prior to the first occurrence of the first Company/Customers/Customer node, while the footer context 206 includes all data located at the closure of the final Company/Customers/Customer node.

Referring to FIG. 1A, the first part of the method includes determination of a partition node XPath in the XML document (step 10). A partition node XPath is a path occurring multiple times within the XML document at the main body portion of the document. The partition node XPath is provided based upon the ETL job requirements and the schema of the XML document. In the example XML document 200, the partition node XPath may be defined as /Company/Customers/Customer, with the repeating portions being the Customer nodes and the defined ETL job compiling data inside the sub-trees rooted at each Customer node. In a modified embodiment, the XML document 200 might include two or more sub-trees at each Customer node. In this modified embodiment, the ETL process could be configured such that data is only compiled from one of the sub-trees (for example, the first sub-tree) of a particular Customer node and not require any data from the other sub-trees associated with that particular Customer node. As described in further detail below, the ETL job or process can use context information located above (e.g., in the header section) and/or below (e.g., in the footer section) the partition node XPath in compiling data for a database.

After the partition node XPath for an XML document has been determined, the correct partition points within the document are identified. It is important to determine the correct point or points within an XML document for partitioning. As previously noted, known techniques parse the XML document to find appropriate partition points that are not located within sections that must remain continuous, such as CDATA sections, comment sections or nested node definition sections.

In computer programming, parsing involves a syntactic analysis of a text or document in order to determine the grammatical structure with respect to a given formal grammar or rules associated with a particular computer language. A parser, which is in essence an interpreter or compiler, checks for correct syntax of the document and builds a data structure (which can be in the form of parse tree, abstract syntax tree or other hierarchical structure) utilizing tokens (such as words), where the parser identifies tokens of the document from the sequence of input characters within the document. Parsing in a markup language document is more than a simple scanning of the document and requires a number of processing steps including, without limitation, identification and marking of node boundaries, attributes, and checking the well formed-ness of the document.

Parsing can be a very time consuming and expensive process which obviates any potential advantages associated with parallel processing of the XML document. In contrast, the present invention utilizes a technique in which an XML document is scanned (not parsed) to find suitable partition points within the main body section of the XML document.

As noted above, the header context comprises the section from the start or some portion at the beginning of the XML document to a point in the document before the first occurrence of a partition node in the partition node XPath (for example, the first Customer node in the /Company/Customers/Customer path of XML document 200). After the header context, the main body portion or section includes a series of multiple occurrences of the partition node (for example, the Customer node in XML document 200), and the footer context comprises the data located beyond the close of the last partition node in the main body context and the end of the XML document (shown as section 206 in XML document 200).

The header context is identified by parsing the XML document using any suitable XML parsing technique (step 20). Examples of suitable XML parsers for practicing this step include, without limitation, pull parsers such as Streaming API for XML (StAX) utilizing Java programming, and SimpleXML utilizing PHP programming. The XML document is parsed from the beginning of the document until the first occurrence of the partition node defined by the partition node XPath. The end of the header context is marked at this location. Thus, the end of header context 202 in XML document 200 can be marked at the comment "<!--Header context end here-->".

The footer context is identified by performing a reverse parsing of the XML document (step 30). The reverse parsing of the XML document is performed by starting at the end of the document and parsing backward toward the end of the main body section. Upon identifying the first occurrence of the close of a partition in the partition node XPath (for example, the comment "<!--Complete structure here-->" at the last occurrence of a Customer node in the /Company/Customers/Customer path of XML document 200), the start of the footer context is marked at this location. Thus, the start of footer context 206 in XML document 200 can be marked at the comment "<!--Footer context starts here-->".

It may be desirable in certain XML documents and based upon the requirements of a particular ETL job to merge the footer context with the header context during parallel processing. This facilitates faster processing of the XML document by obtaining information present in the footer prior to reaching the end of the document. This processing optimization is useful in scenarios in which the ETL job is able to process footer information prior to processing a particular partition node path. In particular, for XML schemas of the type "<xs:all>", the ordering of data processing may be relaxed and less constrained and thus suitable for merging of the header and footer contexts. For other types of XML schemas, such as "<xs:sequence>" types, the ordering of data processing may be more rigid and constrained, such that merger of the header and footer contexts may not be allowed and the footer context must be processed after the last occurrence of a partition node in the partition node XPath.

Referring again to the XML document 200, an example ETL job might convert this document into relational data and populate such data into a relational table for display and/or storage in a database (e.g., a data warehouse). For example, the relational table could include three attributes mapped to /Company/CompanyInformation/@id (part of the header context 202), /Company/Customers/Customer/@id (part of the body context 204), and /Company/DailyActivity/@date (part of the footer context 206). In order to process this document in an ETL job, a typical process would be required to buffer the entire document until the attributes of the footer context information are read, and only then can relational tuples be produced to populate the data in the relational table. By merging the header and footer contexts as described in the process of present invention embodiments, each processor can read the header and footer information along with the partitioned body information being parsed to populate the relational table in a time efficient manner.

Merging of the footer context with the header context (step 40) is performed by moving the values of the footer context to the marked location at the end of the header context while maintaining the sequencing of the level information within the header and footer contexts. For example, if each of the header and footer contexts includes a sub-tree rooted at a second level, the level two sub-tree of the footer is moved after the close of the level two sub-tree of the header. Referring to the example XML document 200, after a merger of the header context 202 with the footer context 206, the level two sub-tree of the footer context 206 (/Company/DailyActivity) is moved to a location after the closing or end point of the level two sub-tree of the header context (/Company/CompanyInformation).

The next step in the process is to identify initial boundaries or partition points within the XML document (step 50). The initial partition points can be determined based upon the size of the document and the number of partitions that can be generated and processed in parallel, with any suitable number of partition points being selected. For example, for an XML document having a size of 4 GB that is to be partitioned into two parts, the first partition part can start at 0 GB and end at 2 GB, while the second partition part can start at 2 GB and end at 4 GB. In another example, if the 4 GB XML document is to be partitioned into four parts, the first part can be from 0 GB to 1 GB, the second part from 1 GB to 2 GB, the third part from 2 GB to 3 GB, and the fourth part from 3 GB to 4 GB. The example partitions noted above result in partitions of approximately the same size. Alternatively, the partitioned parts can be split unevenly so as to have different memory size parts that are processed in parallel.

Once the number and size of each initial partition part is determined, rapid scanning of the XML document is performed from the beginning of the document to the first initial partition point (i.e., the location in the XML document identifying a split between the first and second partitions) to identify specific sections that cannot be separated or split and thus are required to remain continuous (step 60). The types of required continuous sections will depend upon the XML schema and ETL job being performed and can be predetermined such that the scanning process looks specifically for such sections. As noted above, examples of XML document sections required to remain continuous include, without limitation, CDATA sections, comment sections, and nested node definitions. It is noted that the rapid scanning of the XML document is not a parsing technique but instead a simple scanning for specific sections required to remain continuous and which have been predetermined and defined for identification by the scanning process.

A determination is made regarding whether the initial partition point is within a section required to be continuous (step 70 in FIG. 1B). If the first initial partition point is determined to be outside of any section required to be continuous, the initial partition point is set as final partition point (step 80). If the process determines that the initial partition point is within a section required to be continuous, the initial partition point is moved to a location outside of the section required to remain continuous (step 90), where the initial partition point can be moved to a location in the document prior to such section or to a location in the document that is after such section. Thus, the partition boundary is adjusted as necessary so as to not split apart the section required to remain continuous. The process then proceeds to step 80 in which the moved initial partition point is set to a final partition point.

The process next determines whether the end of the XML document has been reached (step 100). If the end has not been reached, the rapid scan is continued to the next initial partition point of the XML document (step 110), and the process is then repeated at step 70 to determine whether the next initial partition point is within a section to remain continuous. If the end of the XML document has been reached, the process proceeds to parallel processing of the XML document using the final partition points (step 120).

The process described above and depicted in the flowchart of FIGS. 1A and 1B ensures that no partition boundary falls within a section of the XML document that must remain continuous. As noted above, the scanning process is not parsing the document to establish partition points, so the process time to populate a database with the data from the XML document can be orders of magnitude faster than a typical parsing process that would otherwise be used to establish partition points for the document.

The final partition points are communicated to the processors or XML processing units such that the partitioned parts can be processed in parallel. In particular, the parallel processing technique can be configured such that each processor parses the complete structural configuration of the XML document, including header and footer contexts (which may be merged as described above) and a smaller portion of the body section that is defined between partition points established by the process. For example, the parser for a particular processor starts reading from the header context, then proceeds to the start of the partition portion of the body to which it is assigned (as defined by the final partition points assigned to the particular processor) and parses this partition portion, followed by moving to the start of the footer context to process information from this point to the end of the XML document. The parser for each processor reads a valid XML document but with a smaller number of data records in the body portion. Thus, the processors provide the appropriate context information (e.g., namespace, header and/or footer data, etc.) that is required for a particular ETL job.

The method described above is not limited to processing XML documents having a header context, footer context, and main body section with multiple repeating nodes similar to the document depicted in FIG. 2. Instead, the method can also be utilized to partition XML documents having a variety of different XML schemas with multiple partition nodes. For example, the method can be implemented to partition an XML document including a header context, a footer context, and one or more further "middle" contexts that are present within the XML document as sub-trees of two or more partition nodes. The method can be implemented to merge the further "middle" contexts with the header and footer contexts during processing and partitioning and prior to parallel processing of the XML document. In addition, the method can be implemented to process a plurality of repeating partition nodes simultaneously, where each repeating partition node is processed along with a header and footer context as well as any other "middle" contexts that may be in the XML document and may be required to process with one or more repeating partition nodes.

Figure 4:
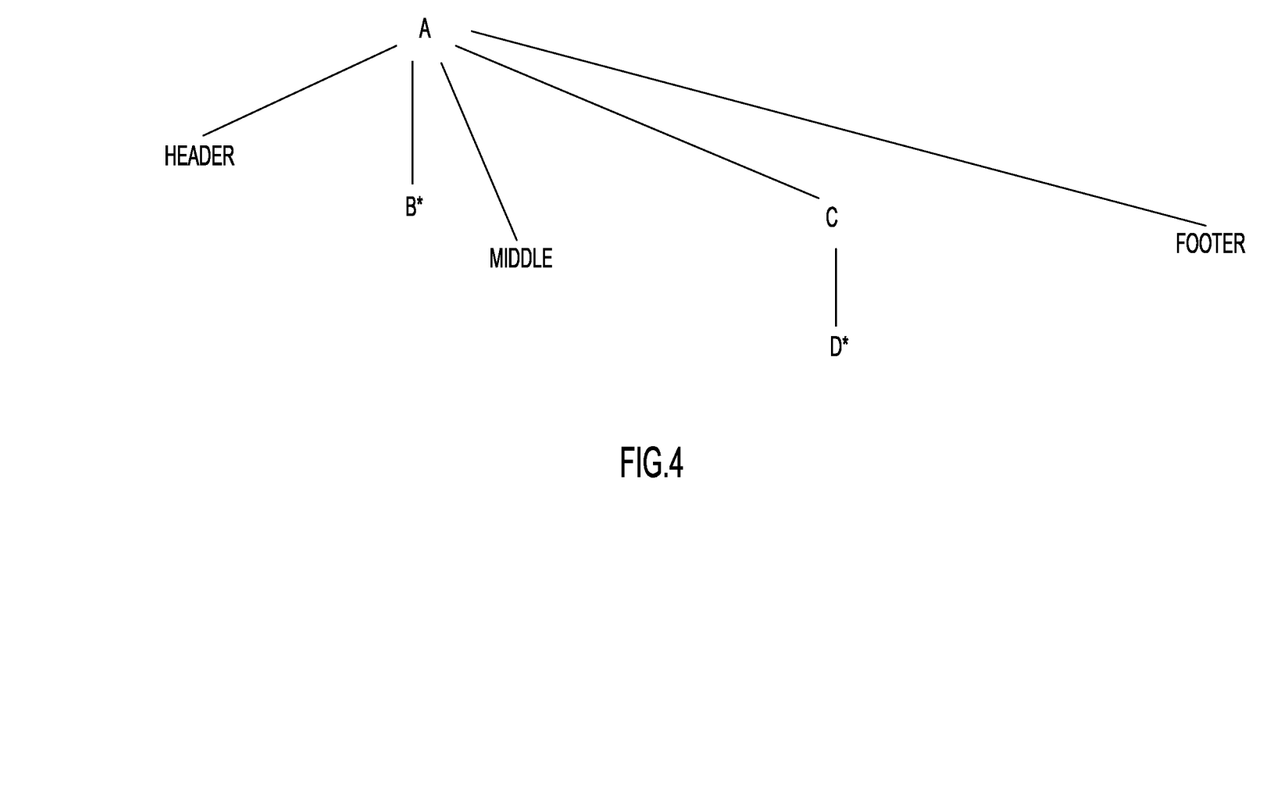
FIG. 4 depicts a tree representing the structure of an example XML document having multiple partition nodes that can be processed simultaneously in accordance with the present invention.

The general structure of an example XML document having a plurality of different repeating partition node paths that can be processed simultaneously in accordance with the invention is depicted in FIG. 4. In this example, the XML document includes a root node A, a header context, middle context and footer context. Two repeating partition paths are also depicted in the tree as /A/B and /A/C/D, where both the B* node and the D* node represent multiple repeating nodes. The example XML document 200 depicted in FIG. 2 might have a tree structure similar to the tree depicted in FIG. 4 with the exception that there is no "middle" context and only a single repeating partition path. As shown in FIG. 4, the two paths leading to multiple repeating nodes B* and D* can be processed independently from each other, such that each repeating node can be processed simultaneously in accordance with the invention. If one or both nodes B* and D* needs the header, footer and middle contexts for processing information, the two repeating partition paths can still be processed simultaneously in accordance with the present invention, where each repeating partition path is partitioned at boundaries residing outside of sections required to be maintained continuous and then subject to parallel processing independently and simultaneously with respect to the other repeating partition path. While the example embodiment shows two repeating partition paths with multiple repeating nodes B* and D*, any other XML schema can also be processed in accordance with the invention including, without limitation, an XML document with any number (e.g., three or more) of repeating partition paths and any number (e.g., none, one, two or more) of middle contexts.

Figure 3:
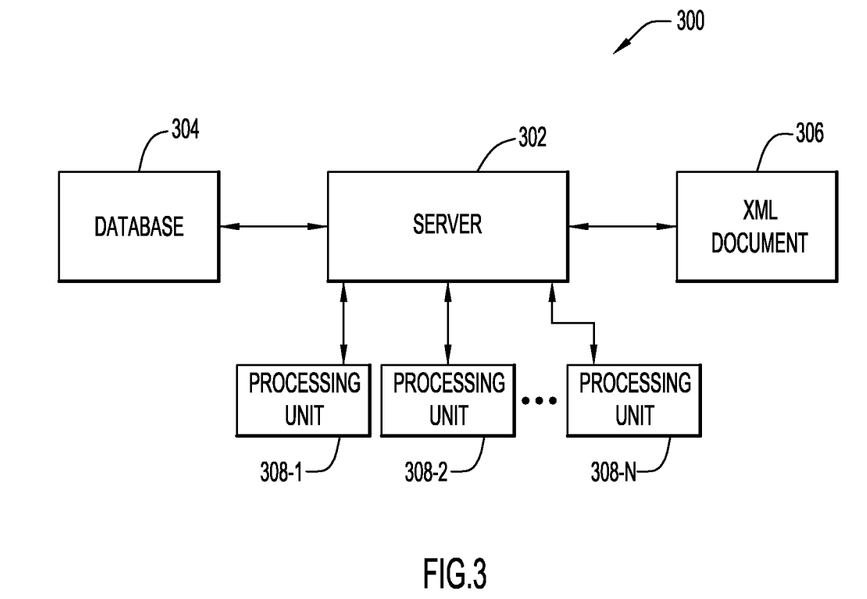
FIG. 3 is a block diagram illustrating an example processor, database, and processing units for partitioning a markup language document in accordance with the present invention.

The method described above and depicted in the flowchart of FIGS. 1A and 1B can be implemented utilizing any suitable system including hardware and software implemented in a single module or unit or two or more separate units. An example embodiment of a system for implementing the method is schematically depicted in FIG. 3. In particular, system 300 includes a server 302 that is operatively coupled to a database 304, such that information processed in an ETL job can be provided to and stored on the database 304. The server 302 receives and/or stores an XML document 306 to be processed. The server 302 can receive and retain the XML document 306 from any one or more suitable sources and/or in any suitable manner including, without limitation, via cloud computing, via network computing in which the server is operatively coupled to one or more other servers, via any suitable computer readable storage medium, etc.

The server 302 is further operatively coupled to a plurality of processing units 308-N to facilitate parallel processing of partitioned portions of the XML document 306. Any suitable number (e.g., two or more) of processing units can be provided, with the number of processing units depending upon the size of the XML document and number of partitions to be formed. The processing units 308-N can be disposed within the hardware of the server 302 or, alternatively, disposed in separate computer systems operatively coupled to server 302 (e.g., in a network computing environment).

The server, database and processing units can be any suitable computer systems implemented by any type of hardware and/or other processing circuitry. In particular, the server, database and processing units may be implemented by any quantity of conventional or other computer systems or devices e.g., computer terminals, personal computers tablets, laptops, etc., cellular telephones, personal data assistants etc., and may include any suitable commercially available or open source operating system and any commercially available or custom software (e.g., browser software, communications software, word processing software, etc.). These systems may include types of displays and input devices (e.g., keyboard, mouse, voice recognition, etc.) to enter and/or view information. In addition, the XML document may be received and retained by the server in any suitable manner. For example, the XML document may be made available to the server on a recordable medium (e.g., magnetic, optical, floppy, DVD, CD, other non-transitory medium, etc.) or in the form of a carrier wave or signal for downloading from a source via a communication medium (e.g., bulletin board, network, LAN, WAN, Intranet, Internet, etc.).

In operation, the server 302 receives and analyzes XML document 306 to determine information regarding the partition node XPath to be utilized based upon the XML schema and the particulars of the ETL job (step 10 of FIG. 1A). The server 302 also finds and marks the end of the header context and start of the footer context (steps 20 and 30), merges the footer and header contexts (step 40), and determines the number and locations of the initial partitions for the XML document (step 50). Next, the server 302 performs the scanning to determine where sections required to be continuous are located within the XML document and ensures that no initial partition point is located within any such section before determining final partition points for the document (steps 60-110 I of FIGS. 1A and 1B). After all of the final partitions have been determined, the server 302 communicates the final partition information and header and footer context information to each processing unit 308-N to initiate parallel processing of the XML document (step 120 of FIG. 1B).

Each processing unit 308-N includes a parser to read and process the header context and then proceed to the partition in the body context to which such processing unit is assigned (based upon the final partition points assigned to such processing unit). Upon reaching the last element of the final partition point for the partitioned portion assigned to a particular processing unit 308-N, the processing unit proceeds to the start of the footer context for reading and processing information at this section of the XML document. Thus, each processing unit 308-N reads a valid XML document (with header context, body context and footer context) but parses a smaller body portion of the XML document in parallel with the other processing units.

In the parallel processing step, the XML document can be partitioned by the server 302 at the various final partition points, with the server 302 subsequently providing each processing unit 308-N with a smaller sized document including the header and footer context as well as a smaller portion of the body context. Alternatively, the server 302 can provide each processing unit 308-N with information regarding the locations of the header and footer context as well as the final partition points corresponding with the body portion to be parsed by a particular processing unit 308-N, where each processing unit 308-N has access to the complete XML document so as to process only the portions assigned to the particular processing unit.

The partitioning of the XML document, including number of partitions to be made within the document, the size of each partitioned portion, and assignment of partitioned portions to one or more designated processing units, can be performed in a variety of different ways and based upon a particular scenario. For example, the server can be configured to partition the XML document and assign one or more partitioned portions for processing to one or more processing units based upon the availability and load capacity of a particular processor. If a first processing unit is determined to have a greater load capacity and/or a faster processing speed in comparison to a second processor (for example, due to the load capacity of the first processing unit and/or the processing tasks required of the first processing unit in comparison to the second processing unit), the server might assign the first processing unit with a larger sized partitioned portion and/or a greater number of partitioned portions to the first processing unit in comparison to the second processing unit.

Information that has been acquired from reading and parsing the XML document during the parallel processing step is transferred to the database 304 for storage in accordance with the ETL process. The information can be transferred from each processing unit 308-N to the server 302 and then to the database. Alternatively, each processing unit 308-N can be operatively coupled to database 304 so as to directly transfer the information obtained during parallel processing to the database.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of identifying partition locations within an XML document and performing parallel processing of the XML document, said method comprising:
    determining, by a processor, a partition node XPath in the XML based upon extract, transfer and load (ETL) job requirements and a schema of the XML document wherein the partition node XPath is a path occurring multiple times within the XML document at a main body portion;
    identifying, by the processor, a header context of the XML document by parsing the XML document from a start of the XML document to a point in the XML document before a first occurrence of a partition node in the partition node XPath;
    marking, by the processor, said XML document at a location prior to the first occurrence of said partition node with an indication of an end point of said header context;
    identifying, by the processor, a footer context of the XML document by reverse parsing of the XML document from an end of the XML document until a first occurrence of a close of a partition in the partition node XPath;
    marking, by the processor, said XML document at a location after the first occurrence of the close of said partition node with an indication of a start point of said footer context; and
    merging, by the processor, the header context and the footer context within said XML document, wherein the merging comprises moving values of the footer context to a marked location at an end of the header context while maintaining sequencing of level information within the header context and the footer context, and each resulting partition is processed with said merged header and said footer context;
    before parsing the main body portion of the XML document:
        determining, by the processor, locations within said XML document to form initial partitions,
        scanning without parsing, by the processor, said XML document to identify sections required to remain continuous based on the ETL job requirements and the schema of the XML document,
        adjusting, without parsing by the processor, boundaries of said initial partitions to reside outside said continuous sections to determine resulting partitions for said XML document; and
    performing parsing via parallel processing of the XML document, by a plurality of processors, using the adjusted boundaries of the resulting partitions.

2. The method of claim 1, further comprising:
    processing said resulting partitions in parallel to provide document information for storage.

3. The method of claim 1, wherein the adjusting boundaries of said initial partitions is performed to maintain at least one of a character data section, a comment section, and a nested node definition within a single continuous section.

4. The method of claim 1, wherein scanning said document for said continuous sections without parsing and adjusting, without parsing, boundaries of said initial partitions to reside outside said continuous sections to determine resulting partitions for said document comprises:
    a) scanning said document from a start point of said XML document to a first partition point to determine whether the first partition point is located within a continuous section;
    b) in response to a determination that the first partition point is within a continuous section, moving the first partition point to a location within said XML document that is prior or subsequent to an occurrence of the continuous section;
    c) repeating steps a) and b) with subsequent partition points until reaching an end of said document, wherein said scanning occurs from an immediate prior partition point to a next partition point in said document.

5. The method of claim 1, wherein said XML document has a memory size of at least 1 GB.

6. A computer program product for identifying partition locations within an XML document and performing parallel processing of the XML document, the computer program product comprising:
    a computer readable storage medium having computer readable program code embodied therewith, the computer readable program code configured to:
    determine, by a processor, a partition node XPath in the XML based upon extract, transfer and load (ETL) job requirements and a schema of the XML document wherein the partition node XPath is a path occurring multiple times within the XML document at a main body portion;
    identify, by the processor, a header context of the XML document by parsing the XML document from a start of the XML document to a point in the XML document before a first occurrence of a partition node in the partition node XPath;
    mark, by the processor, said XML document at a location prior to the first occurrence of said partition node with an indication of an end point of said header context;
    identify, by the processor, a footer context of the XML document by reverse parsing of the XML document from an end of the XML document until a first occurrence of a close of a partition in the partition node XPath;
    mark, by the processor, said XML document at a location after the first occurrence of the close of said partition node with an indication of a start point of said footer context; and merge, by the processor, the header context and the footer context within said XML document, wherein the merging comprises moving values of the footer context to a marked location at an end of the header context while maintaining sequencing of level information within the header context and the footer context, and each resulting partition is processed with said merged header and said footer context;

before parsing the main body portion of the XML document, the computer readable program code is further configured to:

determine, by the processor, locations within said XML document to form initial partitions,     scan, without parsing, said XML document to identify sections required to remain continuous based on the ETL job requirements and the schema of the XML document, and     adjust, without parsing, boundaries of said initial partitions to reside outside said continuous sections to determine resulting partitions for said document; and perform parsing via parallel processing of the XML document, by a plurality of processors, using the adjusted boundaries of the resulting partitions.

7. The computer program product of claim 6, wherein said computer readable program code is further configured to:
process said resulting partitions in parallel to provide document information for storage.

8. The computer program product of claim 6, wherein the computer readable program code is further configured to adjust boundaries of said initial partitions so as to maintain at least one of a character data section, a comment section, and a nested node definition within a single continuous section.

9. The computer program product of claim 6, wherein said computer readable program code is configured to scan said XML document for said continuous sections without parsing and adjust boundaries of said initial partitions to reside outside said continuous sections to determine resulting partitions for said document by:

a) scanning said XML document from a start point of said document to a first partition point to determine whether the first partition point is located within a continuous section;

b) in response to a determination that the first partition point is within a continuous section, moving the first partition point to a location within said document that is prior or subsequent to an occurrence of the continuous section;

c) repeating steps a) and b) with subsequent partition points until reaching an end of said XML document, wherein said scanning occurs from an immediate prior partition point to a next partition point in said document.

10. A system for identifying partition locations within an XML document and performing parallel processing of the XML document, the system comprising:

a processor configured with logic to:

determine a partition node XPath in the XML based upon extract, transfer and load (ETL) job requirements and a schema of the XML document wherein the partition node XPath is a path occurring multiple times within the XML document at a main body portion;

identify a header context of the XML document by parsing the XML document from a start of the XML document to a point in the XML document before a first occurrence of a partition node in the partition node XPath;

mark said XML document at a location prior to the first occurrence of said partition node with an indication of an end point of said header context;

identify a footer context of the XML document by reverse parsing of the XML document from an end of the XML document until a first occurrence of a close of a partition in the partition node XPath;

mark said XML document at a location after the first occurrence of the close of said partition node with an indication of a start point of said footer context; and     merge the header context and the footer context within said XML document, wherein the merging comprises moving values of the footer context to a marked location at an end of the header context while maintaining sequencing of level information within the header context and the footer context, and each resulting partition is processed with said merged header and said footer context;

before parsing the main body portion of the XML document, the processor is further configured with logic to:

determine locations within said XML document to form initial partitions,     scan, without parsing, said document to identify sections required to remain continuous based on the ETL job requirements and the schema of the XML document, and     adjust, without parsing, boundaries of said initial partitions to reside outside said continuous sections to determine resulting partitions for said document; and perform parsing via parallel processing of the XML document, by a plurality of processing units, using the adjusted boundaries of the resulting partitions.

11. The system of claim 10, further comprising:
a plurality of processing units in communication with said processor, where said processing units are configured to process said resulting partitions in parallel to provide document information for storage.

12. The system of claim 11, further comprising:
a storage database coupled with at least one of said processor and said plurality of processing units and configured to receive and store said document information.

13. The system of claim 10, wherein said processor is further configured with logic to scan said XML document for said continuous sections without parsing and adjust boundaries of said initial partitions to reside outside said continuous sections to determine resulting partitions for said document by:

a) scanning said XML document from a start point of said document to a first partition point to determine whether the first partition point is located within a continuous section;

b) in response to a determination that the first partition point is within a continuous section, moving the first partition point to a location within said XML document that is prior or subsequent to an occurrence of the continuous section;

c) repeating steps a) and b) with subsequent partition points until reaching an end of said XML document, wherein said scanning occurs from an immediate prior partition point to a next partition point in said XML document.

14. The system of claim 10, wherein the processor is further configured with logic to adjust boundaries of said initial partitions so as to maintain at least one of a character data section, a comment section, and a nested node definition within a single continuous section.

\* \* \* \* \*